US006429990B2

(12) United States Patent
Serrano et al.

(10) Patent No.: US 6,429,990 B2
(45) Date of Patent: *Aug. 6, 2002

(54) METHOD AND APPARATUS FOR CONTROLLING WRITE OPERATIONS OF A DATA STORAGE SYSTEM SUBJECTED TO A SHOCK EVENT

(75) Inventors: Louis Joseph Serrano; Gary Allan Herbst, both of San Jose, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/428,828

(22) Filed: Oct. 28, 1999

Related U.S. Application Data

(63) Continuation-in-part of application No. 08/794,614, filed on Feb. 3, 1997, now Pat. No. 6,115,200.

(51) Int. Cl.⁷ .............................................. G11B 19/04
(52) U.S. Cl. .......................................... 360/60; 360/69
(58) Field of Search ............................... 360/60, 69, 75

(56) References Cited

U.S. PATENT DOCUMENTS

| 4,862,298 A | | 8/1989 | Genheimer et al. ............ 360/60 |
| 4,947,093 A | | 8/1990 | Dunstan et al. ............. 318/560 |
| 5,005,089 A | * | 4/1991 | Thanos et al. ........... 360/77.08 |
| 5,333,138 A | | 7/1994 | Richards et al. ................ 371/7 |
| 5,491,394 A | | 2/1996 | Harwood et al. ............ 318/563 |
| 5,654,840 A | | 8/1997 | Patton et al. .................. 360/75 |
| 5,663,847 A | | 9/1997 | Abramovitch ........... 360/77.02 |
| 5,696,645 A | | 12/1997 | Laughlin ...................... 360/75 |
| 5,721,457 A | | 2/1998 | Sri-Jayantha et al. ........ 307/119 |
| 5,737,481 A | * | 4/1998 | Gushima et al. ............ 386/113 |
| 5,995,462 A | * | 11/1999 | Harold-Barry ................ 369/54 |
| 6,018,431 A | * | 1/2000 | Carlson et al. ................ 360/60 |

FOREIGN PATENT DOCUMENTS

| JP | 62-089269 | 4/1987 |
| JP | 63-149887 | 6/1988 |
| JP | 1-208776 | 8/1989 |
| JP | 1-229454 | 9/1989 |
| JP | 1-277361 | 11/1989 |
| JP | 3-207063 | 9/1991 |
| JP | 4-176063 | 6/1992 |
| JP | 4-222970 | 8/1992 |
| JP | 4-330679 | 11/1992 |
| JP | 8-124271 | 5/1996 |
| JP | 8-279238 | 10/1996 |

OTHER PUBLICATIONS

IBM Technical Disclosure Bulletin "Optimal Means for Generating a Write Inhibit in Hard Disk Drives in Response to External Shock Using Accelerometers", vol. 39, No. 10, p. 131 (Oct. 1996).

\* cited by examiner

Primary Examiner—Andrew L. Sniezek
(74) Attorney, Agent, or Firm—Altera Law Group, LLC

(57) ABSTRACT

A method and apparatus for controlling write operations for a data storage system during and after a shock event is disclosed. A shock sensor measures the magnitude of a shock event and compares the magnitude of the shock event to at least two predetermined thresholds. Write operations are then inhibited based upon the comparison of the magnitude of the shock event and the at least two predetermined thresholds. When the shock event meets a first upper threshold, the write is inhibited until the write is requalified. The write is executed if the measured shock event does not meet a second lower threshold and the write is paused for a predetermined time period when the measured shock event meets the second lower threshold but does not meet the first upper threshold.

10 Claims, 4 Drawing Sheets

METHOD AND APPARATUS FOR CONTROLLING WRITE OPERATIONS OF A DATA STORAGE SYSTEM SUBJECTED TO A SHOCK EVENT

This is a continuation-in-part of application Ser. No. 08/794,614, filed Feb. 3, 1997, now U.S. Pat. No. 6,115,200, which application is incorporated herein by reference.

BACKGROUND OF THE INVENTION

1. Field of the Invention

This invention relates in general to data storage systems, and more particularly, to a method and apparatus for controlling write operations to a data storage medium in response to the data storage system being subjected to a shock event.

2. Description of Related Art

A typical data storage system includes a magnetic medium for storing data in magnetic form and a transducer used to read and/or write magnetic data from/to the storage medium. A disk storage device, for example, includes one or more data storage disks coaxially mounted on a hub of a spindle motor. The spindle motor rotates the disks at speeds typically on the order of several thousand revolutions-per-minute. Digital information, representing various types of data, is typically written to and read from the data storage disks by one or more transducers, or read/write heads, which are mounted to an actuator assembly and passed over the surface of the rapidly rotating disks. In a typical digital data storage system, digital data is stored in the form of magnetic transitions on a series of concentric, spaced tracks comprising the surface of the magnetizable rigid data storage disks. The tracks are generally divided into a plurality of sectors, with each sector comprising a number of information fields. One type of information field is typically designated for storing data, while other fields contain track and sector position identifications and synchronization information, for example. Data is transferred to, and retrieved from, specified track and sector locations by the transducers, which follow a given track and move from track to track, typically under the servo control of a controller.

Writing data to a data storage disk generally involves passing a current through the write element of the transducer assembly to produce magnetic lines of flux, which magnetize a specific location of the disk surface. Reading data from a specified disk location is typically accomplished by a read element of the transducer assembly sensing the magnetic field or flux lines emanating from the magnetized locations of the disk. As the read element passes over the rotating disk surface, the interaction between the read element and the magnetized locations on the disk surface results in the production of electrical signals in the read element. The electrical signals correspond to transitions in the magnetic field.

To reduce system errors, it is desirable to locate the read/write elements within the boundaries of each track during the read and write operations of the disk drive. If the read/write elements are moved toward an adjacent track by an external disturbance, the data in the adjacent track can be corrupted if a write operation is in progress. For example, if the read/write transducers move while the system is writing, the new data may write over the old data on the adjacent track, resulting in an unrecoverable loss of the old data.

Present data storage systems typically prevent head movement by employing a closed-loop servo control system. During normal data storage system operation, a servo transducer, generally mounted proximate the read/write transducers, or, alternatively, incorporated as the read element of the transducer, is typically employed to read information for the purpose of following a specified track (track following) and seeking specified track and data sector locations on the disk (track seeking).

Despite the servo system, data storage systems are susceptible to problems arising from external shock and vibrational loads. An excessive shock or vibrational load (shock event) may cause the read/write elements to move off track, for example, to an adjacent track. If this head movement occurs while the drive is writing data, the old data on the adjacent track may be lost. It is therefore desirable to have a data storage system, which prevents data from being lost when the system is subjected to a shock event. Typically servo systems are too slow to prevent at least some data from being lost, particularly if a high frequency shock event were to occur.

Typically systems for preventing write operations when the data storage system is subject to a shock event only inhibit write operations in the presence of the shock event. Oscillations in data storage systems caused by transient shock motion resulting from the excitation of the frequency component modes of the data storage system are not accounted for. That is, when the shock event stops, these systems allow write operations to be performed while post-shock motion or oscillations occur.

For example, if the initial offtrack magnitude of the read/write elements caused by a shock event is sufficiently large to be of concern, the data storage system will cause write operations to stop by setting a write inhibit flag. The write inhibit flag is then dropped when the read/write elements are positioned ontrack by the servo system. The read/write elements however are typically positioned ontrack prior to the dissipation of the energy of the shock event. In other words, the read/write elements often oscillate about the track several times before the energy of the shock dissipates. The offtrack that occurs during these oscillations is typically much larger than the initial offtrack because of the gains of the modes that are excited. If the read/write elements then move offtrack again because one or more component modes were excited by the shock, the written data may be unreadable.

It is also possible that data on an adjacent track can be overwritten and made unreadable. This can cause the data to be written away from track center, leading to damage to an adjacent track or a failure to overwrite old information. Both these events can cause unrecoverable corruption of data. Once way to ameliorate this problem is to have a high servo sample rate. But the size of the shock that can be tolerated is limited by the amount of real estate that can be devoted to the servo pattern, i.e., for any sample rate there is a large enough shock to cause off track writes.

To improve write operations during shock events, a shock sensor is often used to disable the write gate. However, this isn't a complete solution. For example, as suggested above, the worst motion caused by the shock can arise from the dynamical response that persists long after the shock itself has ended. A requalification by the servo may be forced when a shock is detected so that the write gate is re-enabled only after the requalification. Unfortunately, a requalification process is very time consuming, e.g., taking tens of milliseconds typically. Thus, invoking a requalification process may impact system throughput.

It can be seen then that there is a need for a method and apparatus for preventing write operations during shock events of different magnitudes while maximizing the system throughput.

SUMMARY OF THE INVENTION

To overcome the limitations in the prior art described above, and to overcome other limitations that will become apparent upon reading and understanding the present specification, the present invention discloses a method and apparatus for controlling write operations for a data storage system during and after a shock event.

The present invention solves the above-described problems by providing a shock sensor that measures the magnitude of a shock event and compares the magnitude of the shock event to at least two predetermined thresholds. Write operations are then inhibited based upon the comparison of the magnitude of the shock event and the at least two predetermined thresholds.

A method and apparatus in accordance with the principles of the present invention includes detecting and measuring a shock event, determining whether the measured shock event meets a first predetermined criteria and disabling the write until the write is requalified when the measured shock event meets the first predetermined criteria.

Other embodiments of a method and apparatus in accordance with the principles of the invention may include alternative or optional additional aspects. One such aspect of the present invention is that the method further includes determining whether the measured shock event meets a second predetermined criteria, executing the write when the measured shock event does not meet the second predetermined criteria and pausing the write for a predetermined time period when the measured shock event meets the second predetermined criteria but does not meet the first criteria.

Another aspect of the present invention is that the pausing the write for a predetermined time period comprises activating an unlatched logic circuit for controlling a write gate.

Another aspect of the present invention is that the second predetermined criteria comprises a maximum threshold.

Another aspect of the present invention is that the disabling the write until the write is requalified the determining step comprises activating a latched logic circuit for controlling a write gate.

Another aspect of the present invention is that the first predetermined criteria comprises a minimum threshold.

These and various other features of novelty as well as advantages that characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings that form a part hereof, and in which is shown by way of illustration the specific embodiment in which the invention may be practiced. It is to be understood that other embodiments may be utilized as structural changes may be made without departing from the scope of the present invention.

According to the present invention, a shock sensor measures the magnitude of a shock event and compares the magnitude of the shock event to at least two predetermined thresholds. Then, write operations are inhibited based upon the comparison of the magnitude of the shock event and the at least two predetermined thresholds.

Figure 1:
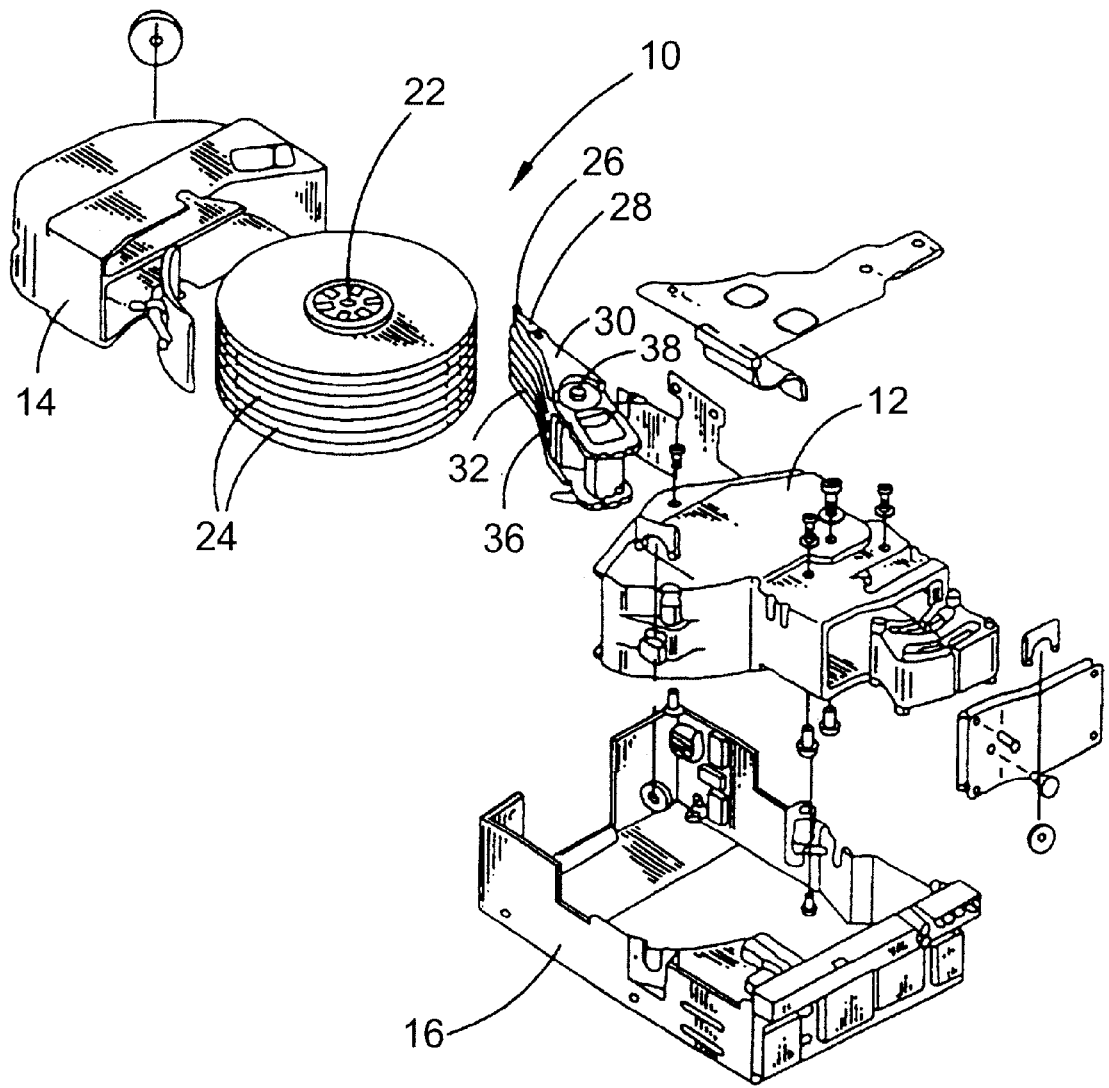
FIG. 1 is an exploded view of a data storage system according to the present invention.

FIG. 1 illustrates an exploded view of a disk drive system 10. The disk drive 10 includes a housing 12 and a housing cover 14 which, after assembly, is mounted within a frame 16. Mounted within the housing is a spindle shaft 22. Rotatably attached to the spindle shaft 22 are a number of magnetic storage disks 24. In FIG. 1, eight disks 24 are attached to the spindle shaft 22 in spaced apart relation. The disks 24 rotate on spindle shaft 22, which is powered by a motor (not shown). Information is written on or read from the disks 24 by magnetoresistive (MR) heads or transducers (not shown) which are supported by sliders 26 and coupled to a channel for processing read and write information (not shown). Preferably, sliders are coupled to the suspensions or load springs 28. The load springs 28 are attached to separate arms 30 on an E block or comb 32. The E block or comb 32 is attached at one end of an actuator arm assembly 36. The actuator arm assembly 36 is rotatably attached within the housing 12 on an actuator shaft 38. The rotary actuator assembly 36 moves the integrated transducer/suspension assembly in accordance with the present invention in an arcuate path across the surface of the storage disk 24. It should be noted that the disk drive described above is provided by way of example and not of limitation. Those skilled in the art will recognize that any data storage system, including optical, magneto-optical, and tape drives, for example, having at least one data storage medium and transducer may be subject to data corruption resulting from post-shock motion of the transducer and may benefit from the present invention.

Figure 2:
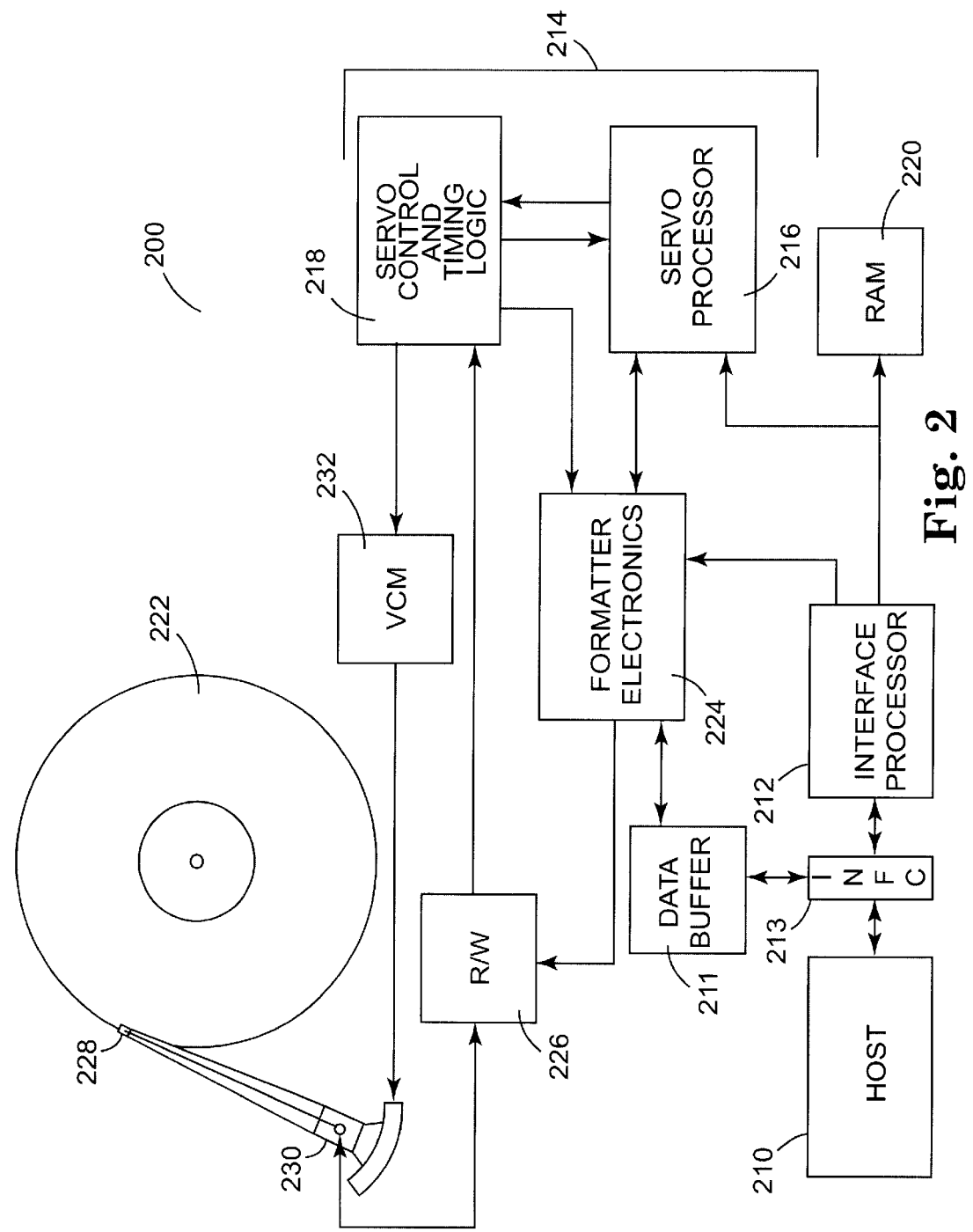
FIG. 2 illustrates a block diagram of a data storage system in accordance with the invention.

FIG. 2 illustrates a block diagram of an exemplary computer disk drive system 200 suitable for practicing the invention. It shall be understood that the general read/write and servo functions of a disk drive are well known in the art, and their particular implementation is not an aspect of the present invention unless expressly noted. A host computer system 210 may be coupled to a disk drive system 200 via a buffer controller in interface block 213 and an interface processor 212. The interface processor 212 processes commands from the host system 210 and in turn communicates with a servo controller 214 and formatter electronics 224. The servo controller 214 includes a servo processor 216 and servo control and timing logic 218. Data parameters may be stored in memory such as random access memory (RAM) 220 or data buffer 211, or alternatively the data may be stored on the disk 222 itself. The servo processor 216 receives commands from the interface processor 212.

Command and sequences and data to be written to the disk 222 are routed to the formatter electronics 224. The read/write circuit 226 conditions the data and routes the data to the head 228 at the end of the actuator arm 230 for writing to the disk 222. Data read from the disk 222 by the transducer or sensor 228 is received by the read/write circuit 226 and conditioned to provide a read pulse output. The read pulse output is then routed to the formatter electronics 224 for processing before being provided to the host 210 via the data buffer 211 and interface electronics (INFC) 213. The interface electronics 213 is coupled to the bus from the host 210 and communicates with the interface processor 212 and data buffer 211.

The servo processor 216 provides control signals to the servo control and timing logic 218. The servo control and timing logic 218 interprets the control signals from the servo processor 216 and sends voice coil control signals to the voice coil motor 232. The voice coil motor 232 drives the actuator arm 230 in accordance with the control signals. The actuator arm 230 supporting the head 228 is driven by the voice coil motor 232 to move the transducer 228 to a target track position on the disk 222. The servo control and timing logic 218 outputs to the servo processor 216 position data indicative of the track position corresponding to the current position of the transducer 228 from servo data read out from the disk 222. The position data may be used to generate servo control information, such as a position error signal (PES signal), values of which indicate the offtrack magnitude of the transducer.

Figure 3:
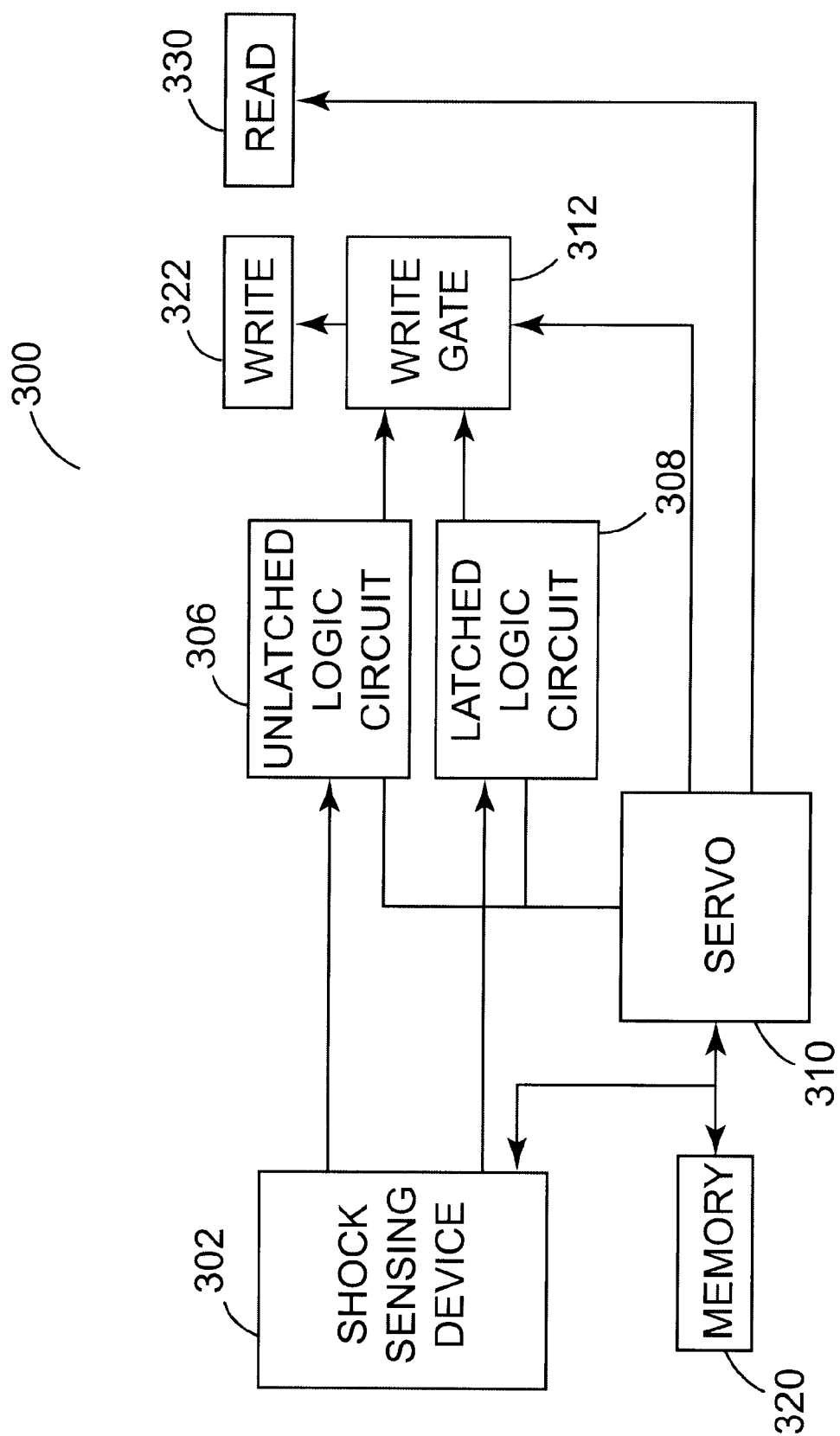
FIG. 3 illustrates a block diagram of an exemplary write prevention system in accordance with the invention.

FIG. 3 is a block diagram illustrating an exemplary write prevention system 300 for preventing a write operation to data storage medium in response to a shock event. The write prevention circuit includes a shock sensing circuit 302 for sensing and measuring shock events. The shock sensing circuit 302 is operatively coupled to an unlatched logic circuit 306 and a latched logic circuit 308. The unlatched 306 and latched 308 logic circuits provide signals to a write gate 312 to enable and disable the write gate 312. The write gate controls the write 322 by the data storage device. Parameters, programs and other data may be stored in the memory 320. The servo 310 directs the read 330 and is in communication with the shock sensing device 302, the memory 320 and the unlatched 306 and latched 308 logic circuits.

Though the shock sensing circuit 302 is illustrated as being separate from the servo controller 310, it is noted that the functionality of the sensing circuit 302 may be embedded and/or programmed within the servo controller 310. Moreover, although the various components of the servo control system and write prevention system 300 are illustrated through the use of circuits, it should be appreciated that these components may be implemented through the use of software (in addition to or in place of circuitry) without loss of functionality.

Generally, when a disk drive is subject to a shock event, the shock sensing circuit 302 detects the shock event and measures its magnitude. The measured magnitude is compared to a first threshold. If the measured magnitude is less than the first predetermined threshold, sensing circuit 302 does not sent a signal to either the unlatched 306 or latched 308 logic circuits to inhibit the write gate 312. If the measured magnitude is greater than the first predetermined threshold but less than a second predetermined threshold, the sensing circuit 302 sends a signal to the unlatched logic circuit 306. The unlatched logic circuit 306 then inhibits the write gate until the shock event passes. The unlatched logic circuit 306 may be designed so that the write is inhibited for a predetermined period of time or the unlatched logic circuit 306 may be instructed by the shock sensing device 302 to wait for a provided period of time based upon the detected magnitude of the shock.

If the measured magnitude is greater than the second predetermined threshold, the sensing circuit 302 sends a signal to the latched logic circuit 308. The latched logic circuit 308 then inhibits the write gate until the latched logic circuit 308 is reset. To be reset, the latched logic circuit 308 must allow for the requalification of the write, e.g., until the servo 310 or the shock sensing device 302 determines that the write may be performed. The comparison of the measured magnitude to the first and second thresholds may be performed by the shock sensing circuit or by the servo.

Generally, any number of well-known circuits may be used to sense the occurrence of a shock event. Exemplary shock sensing circuits will be briefly discussed with more detailed implementation being left to those of skill in the art. For example, the shock sensing circuit 302 may receive PES values and compare these values to the first and second thresholds, and based upon the comparison of the PES values to the first and second predetermined thresholds, the shock sensing circuit 302 may provide control signals to the unlatched 306 and latched 308 logic circuits as described above.

In an alternate embodiment, the shock sensing circuit 302 may include a low pass filter through which a power waveform of the PES signal is passed. The filtered power signal may then be compared to the first and second predetermined threshold values to determine whether a signal should be provided to the unlatched 306 and latched 308 logic circuits as described above.

In yet a different embodiment, the shock sensing circuit 302 may include an external shock sensor, such as an accelerometer, which in response to a shock event generates a signal which is compared against the first and second predetermined threshold values to determine whether a signal should be provided to the unlatched 306 and latched 308 logic circuits as described above.

To assure post-shock movement resulting from excitation of each frequency component mode has subsided, the servo samples preferably at spans at least equal to the time required for one complete cycle of the frequency component mode in the data storage system which has the lowest frequency.

Figure 4:
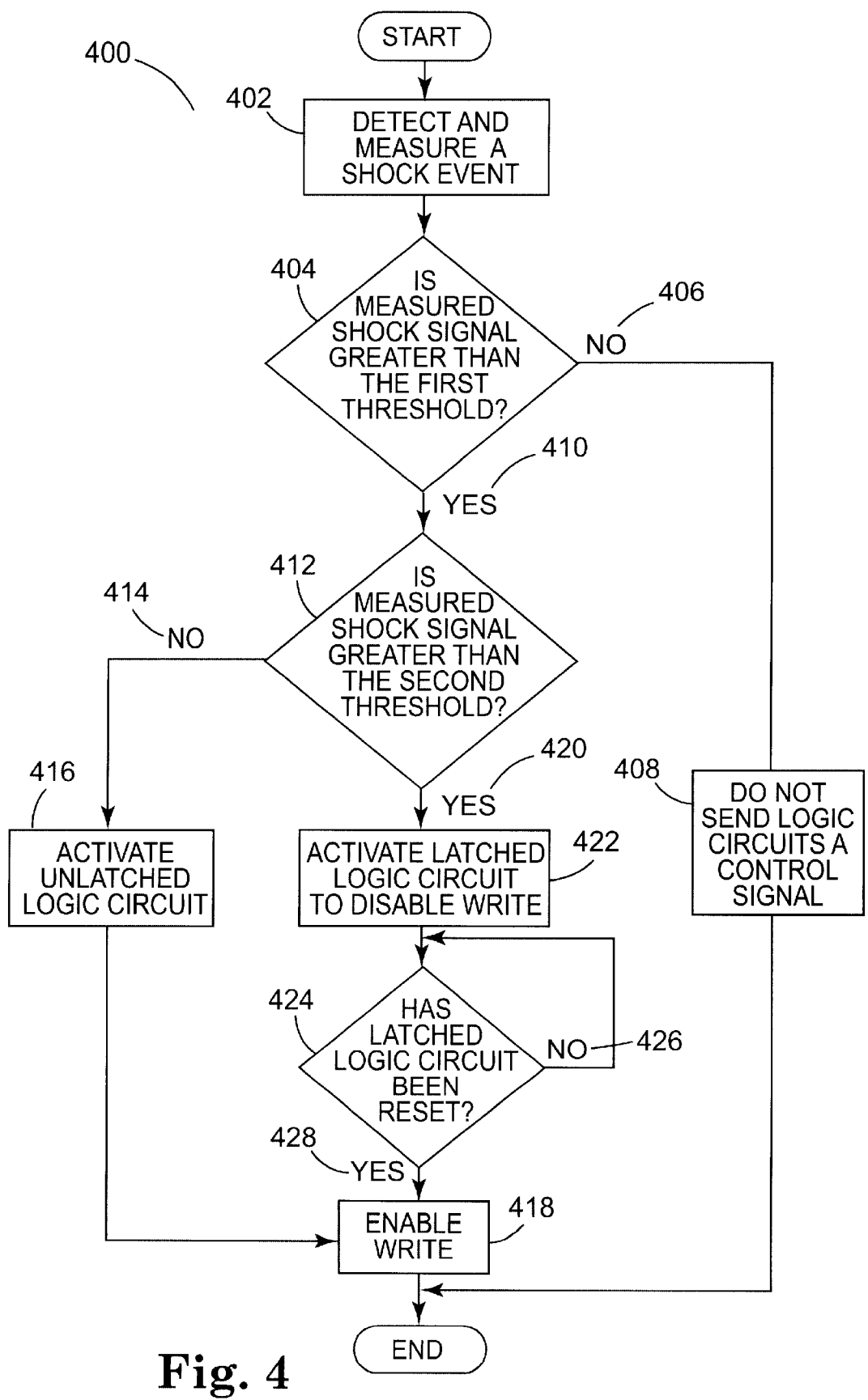
FIG. 4 is a flow chart illustrating an exemplary process for controlling write operations according to the invention.

Turning now to FIG. 4, there is shown a flow chart 400 illustrating an exemplary process for preventing write operations in the presence of shock event of different magnitudes according to the present invention. Generally, the process involves sensing the shock event and inhibiting write operations until the energy of the shock event has dissipated a sufficient amount.

More specifically, a shock event is detected and measured 402. The measured magnitude of the shock event is compared to a first threshold 404. If the measured magnitude is less than the first predetermined threshold 406, a signal is not sent to either the unlatched or latched logic circuits to inhibit the write gate 408. The write is never inhibited.

If the measured magnitude is greater than the first predetermined threshold 410, the measured magnitude of the shock event is compared to a second threshold 412. If the measured magnitude of the shock event is less than a second predetermined threshold 414, the sensing circuit sends a signal to the unlatched logic circuit and the unlatched logic circuit inhibits the write gate until the shock event passes 416. The write is then enabled 418.

If the measured magnitude is greater than the second predetermined threshold 420, the sensing circuit sends a signal to the latched logic circuit 422. A determination is made whether the latched logic circuit has been reset 424. The write is inhibited until the latched logic circuit has been reset 426 by the servo requalifying the write. After the latched logic circuit is reset 428, the write is enabled 418.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of controlling write operations to a storage medium of a data storage system in response to a shock event; comprising:

detecting and measuring a magnitude of a shock event;

comparing the magnitude of the shock event to a threshold window established between first and second thresholds, wherein the second threshold is higher than the first threshold; and disabling the write for a period of time when the measured magnitude of the shock event is within the threshold window.

2. The method of claim 1 further comprising:

executing the write when the magnitude of the measured shock is below the threshold window; and pausing the write until the write is requalified when the magnitude of the measured shock event is above the threshold window.

3. The method of claim 2, wherein the pausing the write for a predetermined time period comprises activating an unlatched logic circuit for controlling a write gate.

4. The method of claim 1, wherein the disabling the write until the write is requalified comprises activating a latched logic circuit for controlling a write gate.

5. A data storage system having one or more frequency component modes, comprising:

a housing;

a data storage medium having a track;

a spindle motor mounted to the housing and adapted for rotating the data storage disk;

an actuator assembly movably mounted to the housing;

a transducer mounted to the actuator assembly; and a write controller comprising:

a shock sensor for detecting and measuring a magnitude of a shock event during a write, the shock sensor comparing the magnitude of the shock event to a threshold window established between first and second thresholds, wherein the second threshold is higher than the first threshold; and an unlatched logic circuit responsive to the shock sensor for disabling a write gate for a period of time when the magnitude of the measured shock event is within the threshold window.

6. The system of claim 5 wherein the write controller further comprises a latched logic circuit responsive to the shock sensor for pausing the write until the write is requalified when the magnitude of the measured shock event is above the threshold window.

7. The system of claim 5 wherein the write controller does not effect the write enable when the magnitude of the measured shock event is below the threshold window.

8. A write controller adaptable for use in controlling a write operation to a storage medium of a data storage system in response to a shock event, comprising:

a shock sensor for detecting and measuring a magnitude of a shock event during a write, the shock sensor comparing the magnitude of the shock event to a threshold window established between first and second thresholds, wherein the second threshold is higher than the first threshold; and an unlatched logic circuit responsive to the shock sensor for disabling a write gate for a period of time when the measured magnitude of the shock event is within the threshold window.

9. The write controller of claim 8, wherein the write controller further comprises a latched logic circuit responsive to the shock sensor for pausing the write until the write is requalified when the measured magnitude of the shock event is above the threshold window.

10. The write controller of claim 9 wherein the write controller does not effect the write enable when the measured magnitude of the shock event is below the threshold window.

* * * * *